Figure 1:
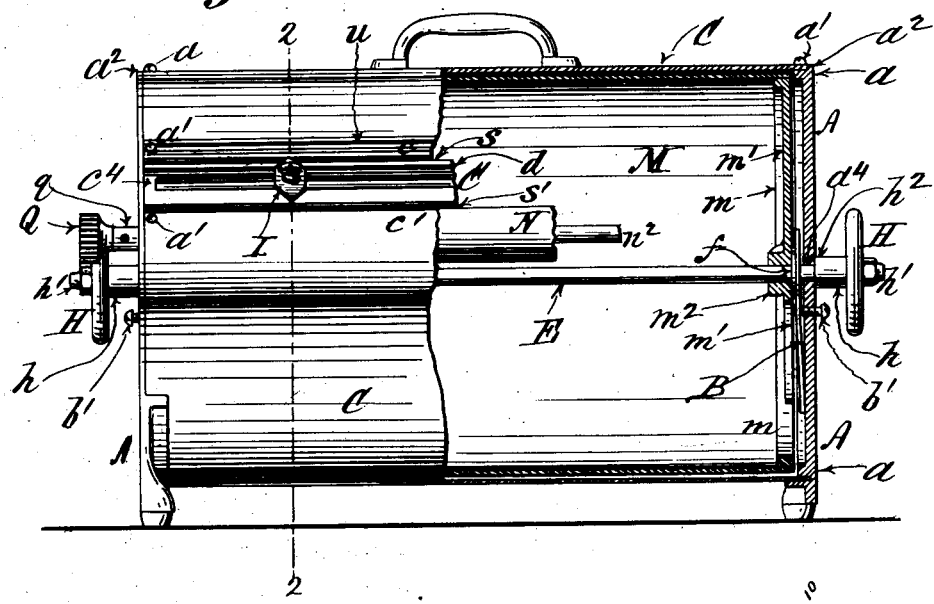

C. J. SMITH.
CALCULATING DEVICE.
APPLICATION FILED DEC. 31, 1910.

998,414.

Patented July 18, 1911.
3 SHEETS—SHEET 1.

Witnesses:
Lillia Miatt
[signature]

Inventor:
Chester J. Smith
By his Attorney
Geo. Wm Miatt

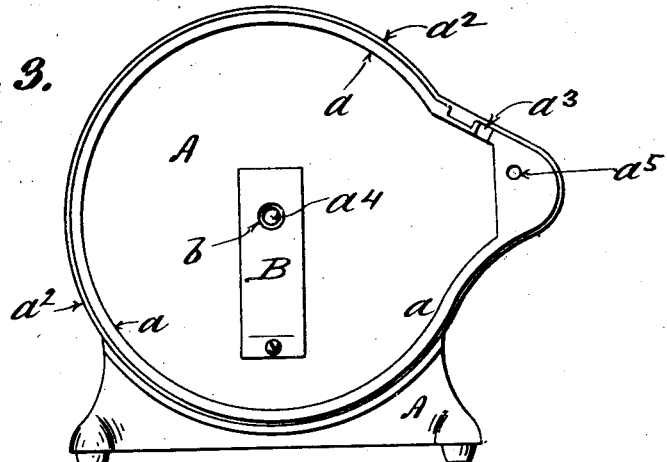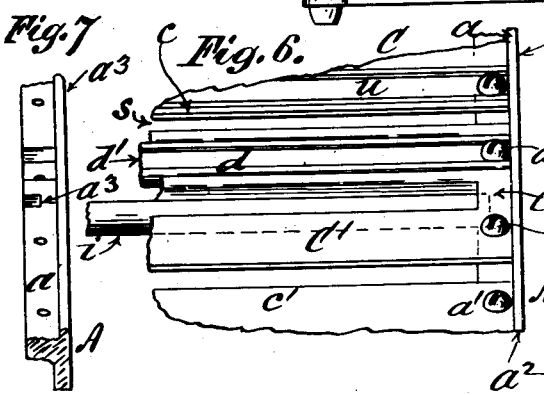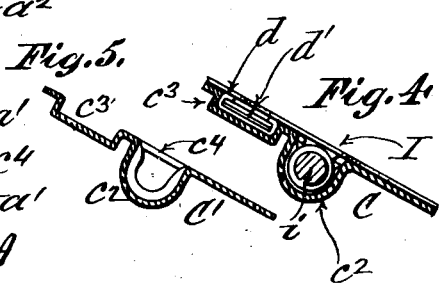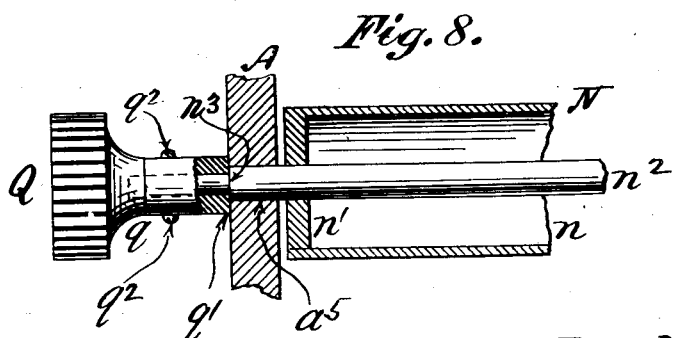

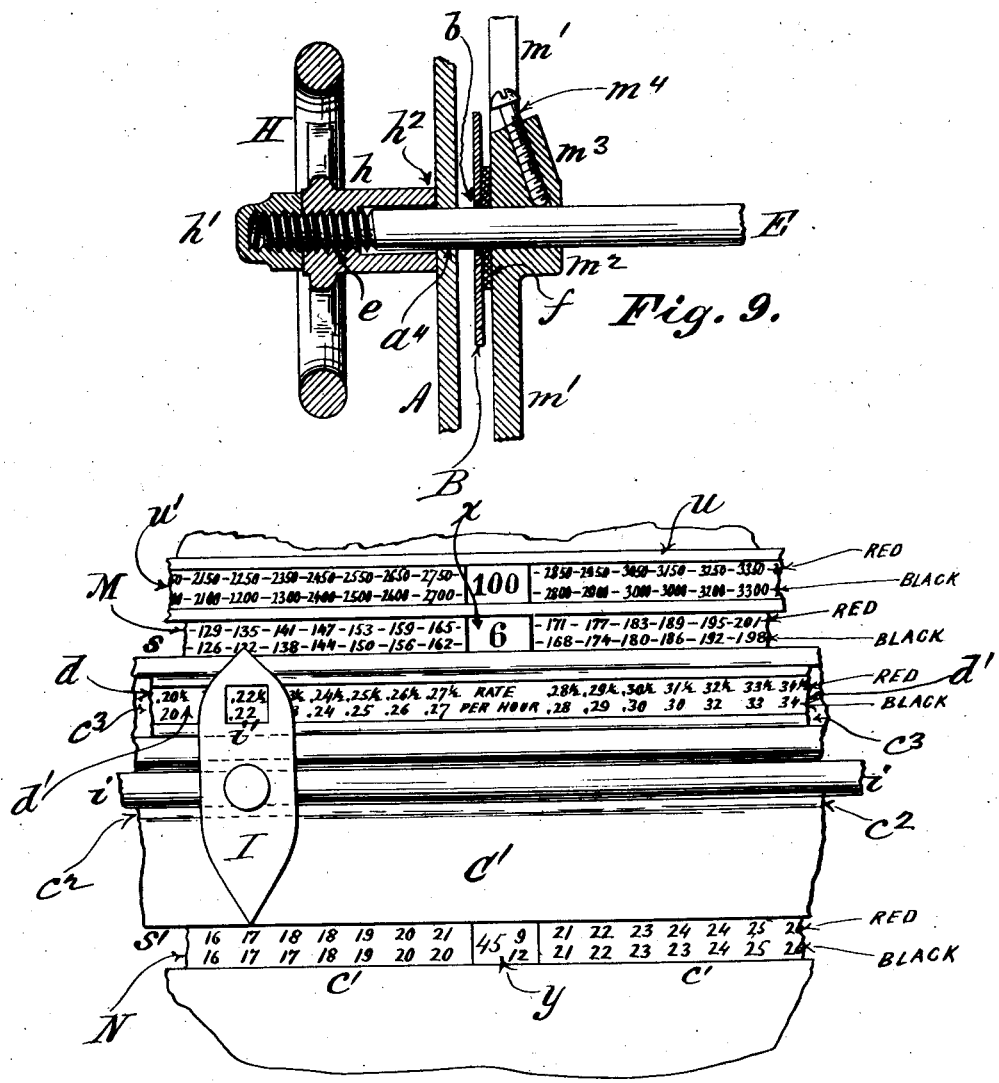

UNITED STATES PATENT OFFICE.

CHESTER J. SMITH, OF JAMESTOWN, NEW YORK, ASSIGNOR TO NATIONAL CALCULATOR COMPANY, OF NEW YORK, N. Y., A CORPORATION OF NEW YORK.

CALCULATING DEVICE.

998,414.      Specification of Letters Patent.      Patented July 18, 1911.

Application filed December 31, 1910. Serial No. 600,207.

*To all whom it may concern:*

Be it known that I, CHESTER J. SMITH, a citizen of the United States, residing in Jamestown, in the county of Chautauqua and the State of New York, have invented certain new and useful Improvements in Calculating Devices, of which the following is a specification.

My improvements relate to the class of apparatus used for facilitating calculations or computations of various kinds, in which rotatable cylinders bearing suitable peripheral charts are arranged with relation to each other and to a rate scale in a suitable casing, substantially as set forth in Letters Patent No. 873,181 issued to me December 10th, 1907, and No. 879,204 issued to me February 18th 1908.

The invention consists in the specific construction and arrangement of parts herein described and claimed, a distinguishing feature being the use of rotatable charts and a rate scale having parallel rows of figures which may be, but are not necessarily coördinate with relation to each other, the adjacent rows being printed or otherwise shown in different colors for the purpose of facilitating reading, and eliminating, as far as possible, all chance for error or miscalculation. Thus, by way of example, a row of figures in one color may represent the number of units, while another row of adjacent parallel figures in a different color may represent the same numbers with fractions added thereto,—the several charts and scales used in conjunction with each other being correspondingly and reciprocally arranged and printed so as to read in unison, as hereinafter more fully set forth. In this connection it is to be noted that I have herein shown and described rotatable charts and a stationary rate scale adapted to the computation of interest, the value of time (labor), piece work, prices of goods either by measures, weight or quantity, &c., although I do not confine myself thereto, since my invention is applicable to various and innumerable other uses and purposes,—the essential feature of my invention in this respect consisting in representing two or more adjoining parallel lines of superposed figures in different colors, whereby I virtually double, or more than double, the capacity of the apparatus for a given length and size. To this end the lines of distinctively colored figures need not necessarily be coördinate or reciprocally related to each other, since two or more distinct, unrelated systems of computation may obviously be provided for in a single apparatus if desired, thereby increasing its scope of utility to any extent found expedient or practicable.

Other distinctive features of my invention relate to the construction and mounting of the chart cylinders used; the means employed for effectually braking and controlling the main or unit-aggregate cylinder, and other details, as hereinafter fully set forth.

Figure 2:
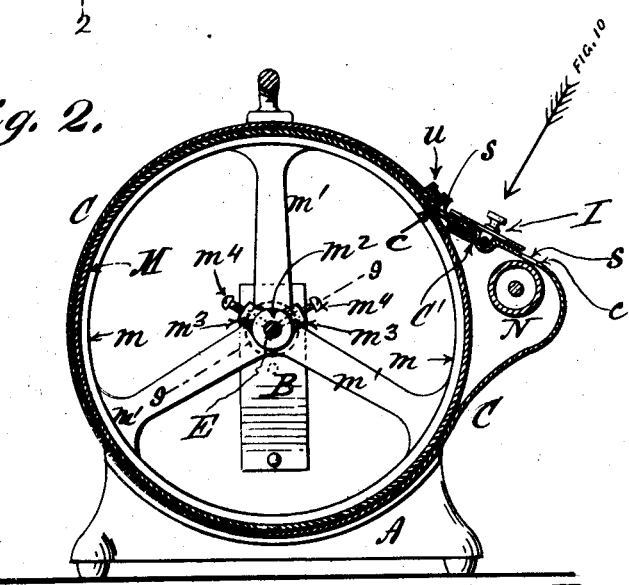

In the accompanying drawings, Figure 1, represents a sectional elevation of my improved calculating device, broken away in part; Fig. 2, is a transverse vertical section taken upon plane of line 2—2, Fig. 1; Fig. 3, is an elevation of the inner side of one of the end standard plates; Fig. 4, is a transverse section of the rate scale and indicator plate; Fig. 5, is a like view with the rate scale and indicator omitted; Fig. 6, is a front elevation of the right hand end of the rate scale and indicator plate and a portion of the end standard plate; Fig. 7, is a front view of the portion of the end standard plate shown in Fig. 6; Fig. 8, is a sectional detail of the left hand end of the auxiliary cylinder, &c.; Fig. 9, is a section, full size, taken upon the plane of line 9—9 Fig. 2; Fig. 10, is an elevation upon an enlarged scale, looking in the direction of the arrow, Fig. 2, and showing the central portions of the scales, &c.

The casing C, mainly cylindrical in general cross section, may be made of sheet metal attached to end plates or standards A, A, of cast metal, one of which is shown in detail in Fig. 3, by reference to which it will be seen that circumferential shoulders $a$, $a$, are formed on the inner side of the plate A, to which the edges of said casing are secured by screws $a'$, $a'$, the edges of the casing being protected by peripheral flanges $a^2$, $a^2$, on the plate A, which for this purpose project beyond the supporting shoulders $a$, $a$. The standards A, A, also support the rate and indicator plate C', forming a portion of the casing, and also screwed to the said internal shoulders $a$, $a$. The upper edge of this plate C', is so spaced with relation to the edge $c$, of the casing C, as to form the longitudinal slot $s$, between them, and in like manner the lower edge of the plate C', is so spaced with relation to the edge $c'$, of the casing C, as to form the longitudinal slot $s'$, between them. The upper slot $s$, exposes the peripheral surface of the main cylinder M, while the lower slot $s'$, exposes the peripheral surface of the auxiliary cylinder N.

The rate scale and indicator plate C', is stamped out of a single piece of sheet metal, with the indicator channel $c^2$, and recess $c^3$, for the reception of the rate index or scale holder $d$, containing the rate slip $d'$. The indicator rod $i$, on which the indicator I, slides, is held in position by end webs $c^4$, $c^4$, on the rate and indicator plate C', by which the ends of said indicator rod are thus confined in recesses $a^3$, $a^3$, in the inner edges of the supporting shoulders $a$, $a$, of the standard plates A, A.

Above the upper sight slot $s$, and extending along the edge $c$, of the casing is the centuplication scale holder $u$, in which is inserted a strip bearing lines of superposed figures representing compensation at rates indicated in the rate scale $d'$, for 100 hours. The holder $u$, consists preferably of a strip of sheet metal the inturned edges of which hold in place a strip $u'$, of paper or other suitable material on which the centuplication scale is imposed, and also preferably a transparent medium for the protection of the same. The holder $u$, and scale strip $u'$, are held in position on the casing C, by end screws $a'$, passing through the casing and into the supporting shoulders $a$, $a$, on the end standard plates A, A. The rows of superposed figures are printed or otherwise shown in different, contrasting colors, corresponding to those representing the coordinate lines of figures in the rate index scale $d'$, and the tables on the peripheries of the main cylinder M, and auxiliary cylinder N.

The peripheral plate of what may be designated as the aggregate unit cylinder M, is secured to skeleton end disks $m$, $m$, each formed with three radial arms $m'$, $m'$, $m'$, and a hub $m^2$, having inclined radial bosses $m^3$, $m^3$, which are tapped at an incline with relation to the plane of the disk for the reception of two convergent inclined binding screws $m^4$, $m^4$, by means of which the cylinder M, is rigidly secured to the main shaft E. By thus inclining the convergent binding screws $m^4$, $m^4$, outward with relation to the plane of the spider disks $m$, $m$, I render the heads of said screws conveniently accessible from the exterior of the cylinder M, and greatly facilitate the assembling and adjustment of the parts.

The main shaft E, is seated in bearings $a^4$, $a^4$, formed in the standard plates A, A. The ends of the main shaft E, protrude beyond the standards A, A, and are formed with screw threads $e$, $e$, (see Fig. 9) for engagement with the corresponding threaded hubs $h$, $h$, of the hand wheels H, H. Lock nuts $h'$, $h'$, on the extreme ends of the shaft E, set the hand wheels H, H, so that the inner ends $h^2$, $h^2$, of their hubs may be utilized as collars or shoulders bearing against the outer sides of the standards A, A, for the purpose of centralizing the main cylinder M, with accuracy. By the use of hand wheels thus applied at both ends of the shaft E, I not only effect the alinement of the main cylinder M, with relation to the other parts in a simple and effective manner, but I also facilitate the manipulation of the main or unit-aggregate cylinder, which is relatively large and heavy.

On account of its size and weight the main cylinder M, when manipulated, readily acquires momentum which tends to carry it beyond a desired reading of the scale, and for this reason, and also to insure the stability of the cylinder when set for a prescribed reading, I have found it expedient to use an automatic brake of peculiar construction at each end of the main or unit-aggregate cylinder M. Hence I secure to the inner side of each standard A, A, a flat metal spring B, formed with an opening $b$, through which the shaft $m$, extends, so that the brake spring B, bears against the adjacent end of the cylinder M, on either side and around said shaft $m$. The opening $b$, for the shaft is in fact preferably circular, although not necessarily so. Interposed between each of the brake springs B, and the adjacent skeleton end disk of the main cylinder M, is a bearing plate $f$, of suitable fibrous material, preferably although not necessarily in the form of an annular washer. This is for the purpose of preventing contact of metal with metal and compensating for any irregularity of surface on the cast skeleton disk, as well as to obviate the noise involved in metallic contact of parts. It also increases frictional resistance between surfaces so that the spring is rendered much more effective in controlling the main cylinder both while at rest or during movement. Each fibrous bearing plate $f$, is loose on the shaft E, and is unattached to either the spring B, or the skeleton disk $m'$, so that it is free to adapt itself to both contact surfaces.

In order to regulate the tension of the brake spring B, with accuracy, and to compensate for wear, &c., I provide each brake spring B, with a tension screw $b'$, engaging with a thread formed for its reception in the end standard plate A, the inner end of the screw impinging against the brake spring and its outer end being formed with means for turning the screw whereby the adjustment of tension may be effected at any time externally without removal of parts.

The auxiliary chart cylinder N, consists of the tube $n$, (see Fig. 8) mounted on end disks $n'$, $n'$, which are rigidly secured to a shaft $n^2$, extending through the whole length of the cylinder, each protruding end being formed with a shoulder $n^3$, against which abuts the inner end $q'$, of the shank $q$, of a handle or turning knob Q, secured to the shaft by two screws $q^2$, $q^2$. The shaft $n^2$, is seated in the bearings $a^5$, $a^5$, in the end standard plates A, A; and the inner ends $q'$, of the shanks $q$, of the knobs Q, bear against the outer sides of the said standard plates A, A, and centralize the cylinder N, with relation to the rate scale $d'$. By the provision of the shoulders $n^3$, $n^3$, on the shaft $n^2$, I facilitate the assembling of the parts, since it is only necessary to bring the ends of the knob-shanks up against said shoulders before securing the knobs to the shaft in order to centralize the cylinder N.

The indicator I, is essentially the same as that shown and described in Letters Patent No. 873,181 hereinbefore referred to, being double-pointed and being formed with a sight opening $i'$, for reading the rate scale $d'$. Two or more of these indicators may be mounted on the rod $i$, as may be found most expedient according to the requirements of the scales or charts used.

The rate scale $d'$, consists preferably of a strip of paper or card inserted in the holder $d$, the latter being formed of a strip of metal with inturned edges which constitute longitudinal flanges for holding the rate scale strip $d'$, and a superposed transparent medium (when used) in position,—the whole fitting in longitudinal recess $c^3$, in the channel plate C'. The rate scale strip $d'$, has printed upon it, say, in black figures the wage units per hour, and in red (or any other contrasting color) fractional wage rates per hour, either above or below the first named row of figures, and coinciding in position therewith. In like manner the chart on the auxiliary cylinder N, is marked with parallel scales in contrasting colors representing compensation at the different wage rates indicated on the rate scale $d'$, for fractional parts of the hour, five minutes being preferably the basis of hour subdivision; and the chart or table on the main or unit-aggregate cylinder M, also bears parallel rows of coinciding figures in contrasting colors giving the computations for compensation for hours at the different wage rates indicated on the rate scale $d'$,—the unit figures and the fractional figures on the rate scale and the corresponding figures on the charts on both cylinders as well as on the centuplication scale $u'$, being identical in color so as to obviously read together when designated and grouped by the indicator I, in the same manner as heretofore when reading a unit system of charts and rate scale represented in a single color. In other words, the essential feature of my invention in this respect consists in portraying two or more systems of computation, whether coördinate or distinct in character, on a single chart table or scale in coinciding parallel rows of figures, each row being printed or represented in a color different and distinctive from the other or others adjacent, so that the figures in any one color in the several scale rows when grouped by an indicator will represent a computation different and distinct from the indicated combination of figures in another color; and hence the scope of my invention is not limited to the charts and rate scale herein shown incidentally by way of illustrating the principle involved, nor to any particular use or purpose other than to differentiate on a single chart, table or scale, a plurality of systems of computation. With this understanding that the scale and charts herein shown simply represent a practical adaptation and application of my idea, we will suppose that it is desired to ascertain the value of labor at the rate of twenty two cents or at twenty two and one half cents (or both), an hour, for a period of one hundred and six hours and three quarters. In such case the indicator I, (see Fig. 10) is adjusted to reveal through its sight opening $i$, both
$22\tfrac{1}{2}$,
said rates, 22 , one above the other, (the upper figures being printed, say, for instance in red, and the lower figures in black); the main aggregate unit cylinder M, is turned until the figure 6, in the central hour column $x$, is visible in the slot $s$, and the auxiliary cylinder N, is turned until the figures 45 in the central minute column $y$, are visible through the slot $s'$. It will then be found that the upper pointer on the indicator I,
135
points to the superposed figures 132, the 135 in red representing the wage for 6 hours at $22\tfrac{1}{2}$ cents per hour while the figures 132 in black represent the wage at 22 cents an hour. By now referring to the auxiliary cylinder N, it will be seen that the lower point of the indicator I, points to the super-
17
posed figures 17, in both red and black, representing the 45 minutes (since fractions of the cent are computed in favor of the wage) and hence 17 added to the 135 will give the total of $1.52 for the period named at the rate of $22\tfrac{1}{2}$ cents, and 17 added to the 132 will give the total of $1.49 for the period of six hours and three quarters at the rate of 22 cents per hour.

If the period for which it is sought to ascertain the compensation is one hundred and six hours and three quarters, the upper red figures in the centuplication scale $u'$, designated by the indicator I, namely, 2250, if added to the $1.52 will make $24.02 for the rate of twenty two and one half cents an hour; and in like manner if the black figures indicated in said centuplication scale, namely 2200, are added to the $1.49, the total will be $23.49 for the rate of twenty two cents per hour.

Of course where the time involved is less than one hundred hours the centuplication scale $u'$, is not taken into consideration, it being supplementary in character, but by its use the capacity for computation is obviously materially increased without increasing the size of the apparatus.

Thus it will be seen that by my method, a plurality of computations may be read at each adjustment of the indicator I; and whether they are correlated as in the example given above, or represent the solution of totally different propositions, is immaterial,—the main fact being that the capacity and utility of the apparatus may be thus doubled or trebled or even further increased by my plan of using distinctive colors for adjacent rows of superposed tables or scales. Furthermore, mechanically considered, my present apparatus, being the result of extended experimental investigation and experience, is standard for the main and auxiliary cylinder type, being easily manipulated and controlled with accuracy,—the automatic brake and other structural features being important factors in the general results.

What I claim as my invention and desire to secure by Letters Patent is,

1. In a device of the character designated, the combination of end standard plates, a main chart cylinder mounted on a shaft, said shaft seated on said end standard plates, said shaft formed with threaded extremities projecting beyond said end standard plates, hand wheels formed with hubs which are threaded for engagement with the threaded ends of the shaft, the inner ends of the hubs of said wheels constituting bearings against the outer sides of the said end standard plates, and cap nuts engaging the threaded outer ends of the shaft and locking the hand wheels in position, whereby the said main chart cylinder may be centralized and held against longitudinal movement, substantially in the manner set forth.

2. A calculating machine of the character designated, comprising a chart cylinder, skeleton end disks formed with radial arms and supporting said chart cylinder, each disk being formed with a plain flush outer surface and with a hub formed with two rearwardly projecting female threaded bosses situated between radial arms of the disk, two rearwardly inclined and relatively convergent binding screws for each hub engaging said female threaded bosses and impinging against the main shaft on approximately opposite sides thereof, the heads of said binding screws when set being within the plane of the outer face of the skeleton disk, said main shaft, end standard plates in which said main shaft is journaled, and a peripheral casing secured to said end standard plates, all for the purpose set forth.

3. In a calculating device, the combination with the casing and end standard plates formed with bearings, of a main chart cylinder and shaft mounted on said bearings in the end plates, external means for rotating the shaft and cylinder manually, a broad flat metallic brake spring attached to the inner side of an end standard and formed with an opening through which the said shaft extends, a bearing plate of fibrous material hung loosely on the shaft between said brake spring and the adjacent disk of the cylinder, and a tension adjusting screw engaging a thread tapped for the purpose in the said end plate, said screw projecting through the latter, and bearing against the brake spring, whereby the frictional contact between the brake spring, bearing plate, and end disk of the cylinder may be varied and regulated from the exterior for the purpose of controlling the motion of the cylinder and obviating noise, as set forth.

4. In a calculating machine, the combination with the casing and end standard plates, of an auxiliary chart cylinder consisting of a tube and end disks, said end disks attached to a shaft, said shaft seated in the end standard plates and extending through said tube and formed with spacing shoulders near each extremity, said spacing shoulders being of the same diameter as the main portion of the shaft and being spaced apart a distance equal to the distance between the outer surfaces of the end standard plates, the ends of the shaft being of reduced diameter, and turn knobs attached to said reduced ends of the shaft, formed with shanks of greater diameter than the spacing shoulders on the shaft against which shoulders they bear, as well as against the outer surfaces of the end standard plates, whereby the auxiliary chart cylinder is centralized and held against longitudinal movement, for the purpose set forth.

5. In a calculating machine, the combination of the end standards A, A, formed with the supporting shoulders $a$, $a$, having the recesses $a^3$, $a^3$, the rate scale indicator plate C′, stamped out of a single piece of sheet metal and comprising the indicator channel $c^2$, the recess $c^3$, for the rate scale holder $d$, and the end webs $c^4$, $c^4$, for retaining the ends of the indicator rod $i$, within the recesses $a^3$, $a^3$, in the end standards, together with the indicator I, its rod $i$, and the rate scale holder $d$, for the purpose and in the manner described.

CHESTER J. SMITH.

Witnesses:
GEO. WM. MIATT,
GORDON S. P. KLEEBERG.